United States Patent
Suzuki

(10) Patent No.: US 9,964,678 B2
(45) Date of Patent: May 8, 2018

(54) WIRE GRID DEVICE

(71) Applicants: IBARAKI UNIVERSITY, Mito-shi, Ibaraki (JP); JAPAN SCIENCE AND TECHNOLOGY AGENCY, Kawaguchi-shi, Saitama (JP)

(72) Inventor: Takehito Suzuki, Hitachi (JP)

(73) Assignees: IBARAKI UNIVERSITY, Mito (JP); JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 163 days.

(21) Appl. No.: 14/914,912

(22) PCT Filed: Aug. 21, 2014

(86) PCT No.: PCT/JP2014/071866
§ 371 (c)(1),
(2) Date: Feb. 26, 2016

(87) PCT Pub. No.: WO2015/029868
PCT Pub. Date: Mar. 5, 2015

(65) Prior Publication Data
US 2016/0209567 A1    Jul. 21, 2016

(30) Foreign Application Priority Data
Aug. 30, 2013   (JP) ................. 2013-179151

(51) Int. Cl.
*G02B 5/30* (2006.01)
*H01Q 15/24* (2006.01)
*G02B 7/00* (2006.01)

(52) U.S. Cl.
CPC ......... *G02B 5/3058* (2013.01); *G02B 5/3041* (2013.01); *H01Q 15/24* (2013.01); *G02B 7/006* (2013.01)

(58) Field of Classification Search
CPC .......... G02B 5/204; G02B 5/208; G02B 5/30; G02B 5/3025; G02B 5/3041;
(Continued)

(56) References Cited

U.S. PATENT DOCUMENTS

| 2009/0136777 A1 | 5/2009 | Fujii et al. |
| 2010/0271692 A1 | 10/2010 | Hor et al. |

(Continued)

FOREIGN PATENT DOCUMENTS

| DE | 10355599 A1 | 7/2005 |
| EP | 0015815 A1 | 9/1980 |

(Continued)

OTHER PUBLICATIONS

Nov. 11, 2014 Search Report issued in International Patent Application No. PCT/JP2014/071866.
(Continued)

*Primary Examiner* — Stephone B Allen
*Assistant Examiner* — Adam W Booher
(74) *Attorney, Agent, or Firm* — Oliff PLC

(57) ABSTRACT

Achieve an extinction ratio in the approximate $10^{-6}$ class for intensity transmittance in the terahertz band with one element. A wire grid device configured from layering a plurality of film substrates each formed from a rectangular polymer film wherein a narrow rectangular metal thin plate is formed in the approximate center of one face thereof. By having the width of the metal thin plate be approximately 1.0 mm, the length of the metal thin plate be approximately 12.0-30 mm, and the thickness of the film substrate be approximately 0.5-50 μm, it is possible to easily achieve an extinction ratio in the approximate $10^{-6}$ class for intensity transmittance in the terahertz band with one element.

5 Claims, 14 Drawing Sheets

(58) Field of Classification Search
CPC .. G02B 5/3058; G02B 7/006; H01Q 15/0006; H01Q 15/0026; H01Q 15/12; H01Q 15/24; G01N 21/3581; G01N 21/3586; G02F 2203/11; G02F 2203/13
USPC ..... 359/350, 352, 359, 360, 485.01, 485.05, 359/487.03
See application file for complete search history.

(56) References Cited

U.S. PATENT DOCUMENTS

| | | | |
|---|---|---|---|
| 2013/0087266 A1 | 4/2013 | Becerril et al. | |
| 2014/0332077 A1* | 11/2014 | Crouse | B82Y 20/00 136/259 |
| 2015/0205079 A1* | 7/2015 | Takayanagi | G01N 21/3581 250/338.1 |
| 2017/0227697 A1* | 8/2017 | Suzuki | G02B 5/3058 |

FOREIGN PATENT DOCUMENTS

| | | |
|---|---|---|
| JP | 2009-223010 A | 10/2009 |
| JP | 2011-180568 A | 9/2011 |
| JP | 5141320 B2 | 2/2013 |

OTHER PUBLICATIONS

Nov. 11, 2014 Written Opinion issued in International Patent Application No. PCT/JP2014/071866.
Fujii, Takashi et al. "The influence on rejection characteristics by the metal thickness of the wire grid in the Thz band." Extended Abstract, the 70th Japan Society of Applied Physics, vol. 3, pp. 1022, 2009.
Fujii, Takashi et al. "Influence on Thz properties with structure, the materials of the wire grid by the metalwork." Extended Abstract; the 68th Japan Society of Applied Physics, vol. 3, pp. 1128, 2007.

* cited by examiner

Fig. 1A
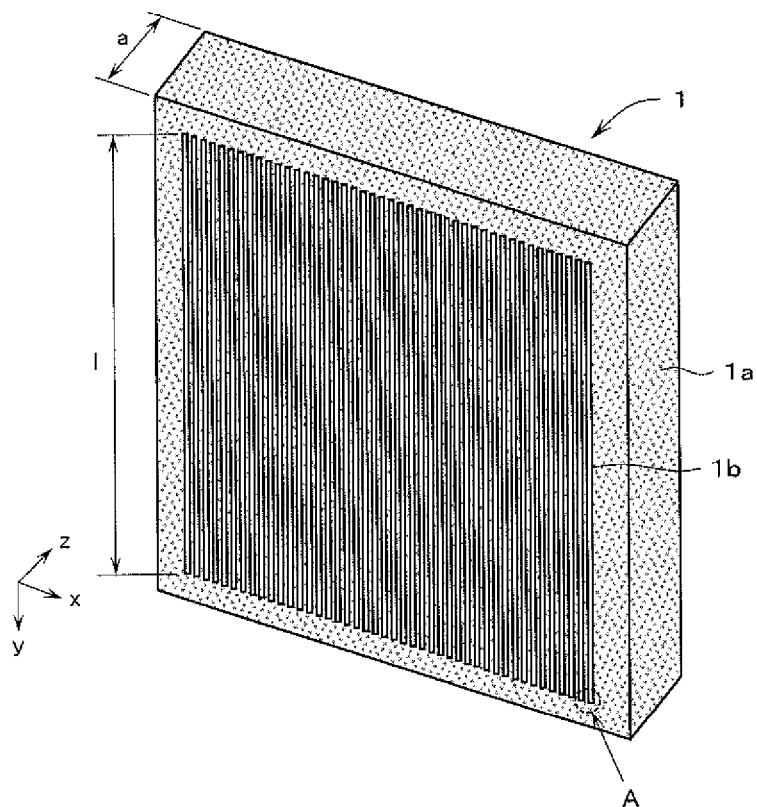
Fig. 1B
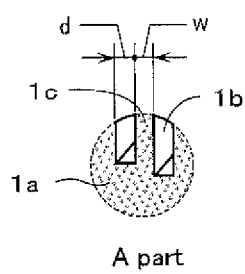
A part
Fig. 1C
| $d$ | 50 μm | $a$ | 2.0 mm | $l$ | 18 mm |

Fig. 4A
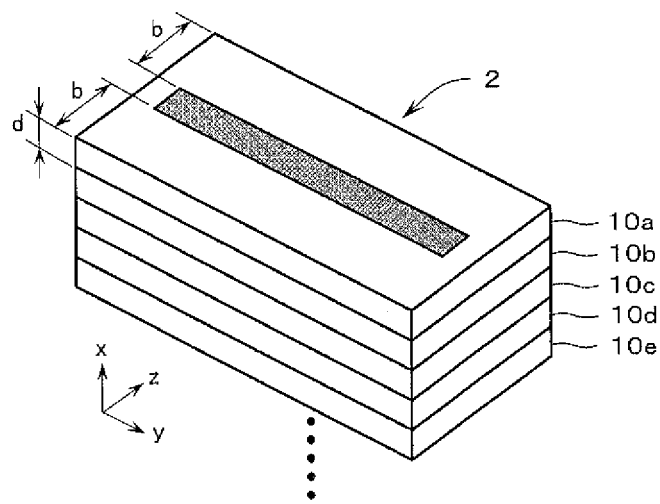
Fig. 4B
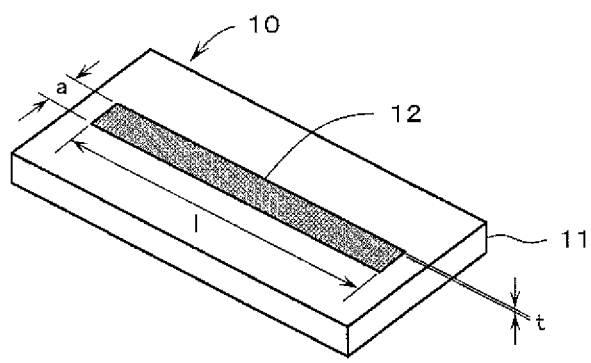
Fig. 4C
| a | 1.0 mm | t | 0.5 µm | l | 12.0 mm |
| b | 2.0 mm | d | 50 µm | | |

Prior Art

Prior Art

Prior Art

WIRE GRID DEVICE

TECHNICAL FIELD

This invention relates to a wire grid device used for a purpose such as polarizing or analyzing mainly of a terahertz electromagnetic wave.

BACKGROUND ART

A terahertz electromagnetic wave is an electromagnetic wave having a frequency from 0.1 to 10 THz (wavelength from 30 to 3000 µm). This wavelength is substantially the same as a range from the wavelength of a far-infrared wave to that of a millimeter wave. The terahertz electromagnetic wave exists in a frequency range between the frequency of "light" and that of a "millimeter wave." Thus, the terahertz electromagnetic wave has both an ability to identify an object with a spatial resolution as high as that of light and an ability comparable to that of a millimeter wave to pass through a substance. An electromagnetic wave in the terahertz wave band has not been explored so far. Meanwhile, application for example to characterization of a material has been examined that is to be achieved by time-domain spectroscopy, imaging, and tomography utilizing the characteristics of the electromagnetic wave in this frequency band. The terahertz electromagnetic wave has both the performance of passing through a substance and straightness. Thus, using the terahertz electromagnetic wave instead of an X-ray allows safe and innovative imaging or ultrahigh-speed radio communication of some hundreds of Gbps.

Use of a wire grid for a purpose such as polarizing or analyzing mainly of a terahertz electromagnetic wave has conventionally been suggested. Researches have been advanced to realize such a wire grid.

According to one example of a conventional free-standing wire grid, the wire grid is formed by aligning metal thin lines of a diameter from about 5 to about 50 µm one by one in a parallel fashion at fixed intervals and affixing the metal thin lines with an adhesive to a meal frame. This free-standing wire grid encounters a limit of an applicable frequency. The free-standing wire grid applicable as a polarizer for a terahertz electromagnetic wave of 1.5 THz or more is generally required to have a fine structure, which is difficult to realize.

Patent literature 1 discloses a metal plate for a wire grid applicable as a polarizer for a terahertz wave band. FIG. 14 is a plan view showing the structure of a metal plate 101 for a wire grid disclosed in this literature. FIG. 15 is a plan view showing a part of the metal plate 101 for a wire grid in an enlarged manner. FIG. 16A is a plan view showing a part of FIG. 15 in a further enlarged manner. FIG. 16B is a sectional view taken along cutting line A-A of FIG. 16A.

The metal plate 101 for a wire grid is made of nickel and has a circular plate shape of a diameter from about 20 to about 100 mm, for example. As shown in FIGS. 14 to 16B, the metal plate 101 includes a plurality of vertical bridge parts 111 extending in the vertical direction in a bridge pattern (thin-line pattern) and at least one cross bridge part 112 substantially orthogonal to each vertical bridge part 111. The vertical bridge parts 111 and the cross bridge part 112 each have opposite ends connected to a flange part 113 of a circular or rectangular shape.

The width of the vertical bridge parts 111 (wire width) and the interval between the vertical bridge parts 111 are parameters that determine the performance of the metal plate 101 for a wire grid and are defined according to the frequency of light to be applied. The metal plate 101 for a wire grid may have a structure applicable to a terahertz electromagnetic wave of 1.5 THz or more and the vertical bridge parts 111 have a width Wa that can be from 1.5 to 50 µm.

In the metal plate 101 for a wire grid, the cross bridge part 112 has a width at least not falling below a given width and not falling below the width of the vertical bridge parts 111. This allows manufacture of the vertical bridge parts 111 of a thin-line structure having the width Wa from 1.5 to 50 µm. The metal plate 101 for a wire grid has a thickness that should be determined in consideration of physical strength against separation from a substrate, for example, or degradation of the characteristics of transmitted light. This thickness is set at 10 µm.

The width Wa of the vertical bridge parts 111 is determined uniquely as a parameter that determines the performance of the metal plate 101 for a wire grid. A parameter about the cross bridge part 112 such as a width Wb of the cross bridge part 112 or an interval between the cross bridge parts 112 (the number of the cross bridge parts 112) is determined mainly in light of assuring the strength of the metal plate 101 for a wire grid. Thus, the width Wb of the cross bridge part 112 is set not to fall below the width of the vertical bridge parts 111. More specifically, the width Wa of the vertical bridge parts 111 is set in a range from 1.5 to 50 µm. The width of the cross bridge part 112 is set at 15 µm or more and is larger than that of the vertical bridge parts 111.

FIG. 17 shows characteristics obtained by using the metal plate 101 for a wire grid where the width Wa of the vertical bridge parts 111 is 20 µm, the interval between the vertical bridge parts 111 is 60 µm, the width Wb of the cross bridge part 112 is 20 µm, the interval between the cross bridge parts 112 is 5 mm, and the thickness of the metal plate 101 is 50 µm. As understood from a characteristic line α2 corresponding to transmissive arrangement and a characteristic line β2 corresponding to blocking arrangement shown in FIG. 17, the metal plate 101 functions as a polarizer for terahertz light of a frequency from 0.1 to 1.5 THz. In this case, if an amplitude direction of the electric field of the terahertz light is orthogonal to the vertical direction in which the vertical bridge parts 111 extend, the transmissive arrangement is produced. If the amplitude direction of the electric field of the terahertz light agrees with the vertical direction in which the vertical bridge parts 111 extend, the blocking arrangement is produced.

PRIOR ART LITERATURE

Patent Literature

Patent Literature 1: Publication of Japanese Patent No. 5141320

SUMMARY OF INVENTION

Problem to be Solved by Invention

A wire grid device used for a purpose such as polarizing or analyzing of a terahertz electromagnetic wave has been required to have characteristics corresponding to an extinction ratio in about $10^{-6}$ class in terms of an intensity transmittance. However, the metal plate 101 for a wire grid described in patent literature 1 cannot achieve such a high extinction ratio.

It is therefore an object of this invention to provide a wire grid device capable of easily realizing an extinction ratio in about $10^{-6}$ class in terms of an intensity transmittance using a single element that cannot be realized by a conventional wire grid device.

Means for Solving Problem

To achieve the aforementioned object, a wire grid device according to this invention is formed by stacking a plurality of film substrates. The wire grid device is most principally characterized in that the film substrates are each formed of a rectangular film having one surface on which an elongated rectangular metal thin plate is formed, and with the plurality of film substrates in a stacked condition, the metal thin plates are arranged so as to overlap each other and parallel flat plates configured by the metal thin plates on corresponding ones of the film substrates form a wire grid operating as a polarizer for terahertz light.

Advantageous Effect of Invention

The wire grid device of this invention includes the wire grid operating as a polarizer for terahertz light and formed by stacking the plurality of film substrates. The film substrates are each formed of the rectangular film having one surface on which the elongated rectangular metal thin plate is formed. In this case, an interval between the metal thin plates as parallel flat plates forming the wire grid is a parameter that determines the performance of the wire grid device. This interval is determined uniquely using the thickness of the film substrates. Specifically, even if being produced on a large scale, the wire grid device of this invention can still maintain this interval at a constant value stably, thereby increasing the yield of the wire grid device. Additionally, the performance of the wire grid device can be changed only by changing the thickness of the film substrates. By setting a width a of the metal thin plates at about 1.0 mm, a length l of the metal thin plates at about 12.0 mm, and a thickness d of the film substrates from about 0.5 to about 50 µm, an extinction ratio in about $10^{-6}$ class in terms of an intensity transmittance can be realized easily in a terahertz wave band using a single element.

BRIEF DESCRIPTION OF DRAWINGS

FIG. 1A is a perspective view showing the structure of a wire grid device according to a first embodiment of this invention.

FIG. 1B is a partially enlarged view showing the structure of the wire grid device according to the first embodiment of this invention.

FIG. 1C is a table showing an example of the dimension of each part of the structure of the wire grid device according to the first embodiment of this invention.

FIG. 4A is a perspective view showing the structure of a wire grid device according to a second embodiment of this invention.

FIG. 4B is a perspective view showing the structure of a film substrate of the wire grid device according to the second embodiment of this invention.

FIG. 4C is a table showing an example of the dimension of each part of the wire grid device according to the second embodiment of this invention.

EMBODIMENTS FOR CARRYING OUT INVENTION

Figure 2:
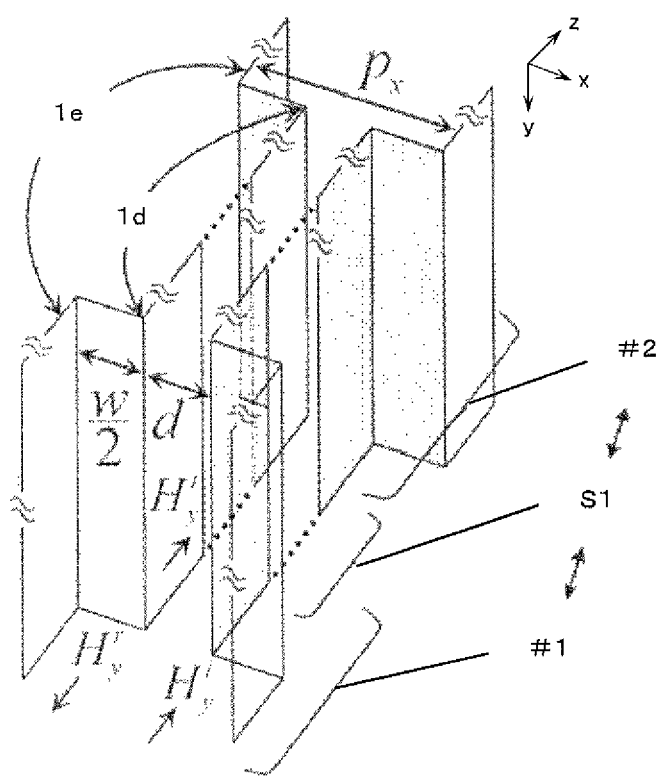
FIG. 2 shows an analytical model about the wire grid device according to the first embodiment of this invention.

FIG. 1A is a perspective view showing the structure of a wire grid device 1 according to a first embodiment of this invention. FIG. 1B is a partially enlarged view of FIG. 1A.

FIG. 1C is a table showing an example of the dimension of each part of the wire grid device 1 according to the first embodiment.

As shown in FIGS. 1A and 1B, the wire grid device 1 of the first embodiment of this invention is formed of a conductive frame 1a of a rectangular parallelepiped having a certain depth and a large number of slits 1b formed so as to penetrate the frame 1a in the vertical direction of the frame 1a. The frame 1a is a conductive frame made of metal, for example, and has a depth a. A large number of the slits 1b have a length l (lower-case character 1) in the vertical direction and are disposed parallel to each other. A region of the frame 1a between the slits 1b forms a grid 1c. The slits 1b have a width d and the grid 1c has a width w. In the wire grid device 1 of the first embodiment, as a result of the presence of the large number of the slits 1b formed in the frame 1a, a large number of the grids 1c as parallel flat plates are formed and function as a wire grid device. The sign 1 also corresponds to the length of the grids 1c and the dimension of an opening in the wire grid device 1.

FIG. 2 shows an analytical model used for analyzing a transmittance and an extinction ratio of the wire grid device 1 of the first embodiment.

Terahertz light incident on the wire grid device 1 of the first embodiment to travel in the z-axis direction enters the frame 1a with the slits 1b, passes through between the grids 1c at the frame 1a having the depth a, and exits the wire grid device 1. FIG. 2 shows an analytical model prepared by modeling this passage. This analytical model is formed of: a region of periodic boundary walls 1e as a virtual region in front of the frame 1a where the terahertz light is yet to be incident; a region of electric walls 1d coupled to the periodic boundary walls 1e through a step structure #1, facing each other at an interval d, and having a depth a; and a region of the periodic boundary walls 1e as a virtual region behind the frame 1a and coupled to the region of the electric walls 1d through a step structure #2. The electric walls 1d are formed of the grids 1c having the depth a and the width w. Thus, the step structures #1 and #2 have a step height w/2 that is half of the width w of the grids 1c.

The first step structure #1 and the second step structure #2 are connected through a scattering matrix S1 corresponding to the distance a. A step of the height w/2 connecting the periodic boundary wall 1e and the electric wall 1d is analyzed by the mode-matching method. According to an analysis conducted by the mode-matching method, zones having known characteristics are defined by division, a field in a region of each connection between the zones is obtained by calculation, and overall response is calculated. The following describes the analysis on the wire grid device 1 of the first embodiment by the mode-matching method.

An incident wave has a TM mode (Transverse Magnetic mode). An incident wave $H^i_y$, a reflected wave $H^r_y$, and a transmitted wave $H^t_y$ with a magnetic field H (vector) are expressed as follows:

[Formula 1]

$$H^i_y = \exp(-jk_0 z) \quad (1)$$

$$H^r_y = \sum_{m=0}^{\infty} A_m I_m \exp(+jk_m z) \quad (2)$$

$$H^t_y = \sum_{n=1}^{\infty} B_n I_n \exp(-jk_n z) = \sum_{l=0}^{\infty} C_l I_l \exp(-jk_l z) \quad (3)$$

where $I_m$, $I_n$, and $I_l$ show basis functions expressed as follows:

[Formula 2]

$$I_m = \cos(m\pi x/d) \quad (4)$$

$$I_n = \cos(2n\pi x/p_x) \quad (5)$$

$$I_l = \cos(2l\pi x/p_x) \quad (6)$$

Px above is w/2+d+w/2=w+d.

The following expressions are further established:

[Formula 3]

$$k_m = \sqrt{k_0^2 - (m\pi/d)^2} \quad (7)$$

$$k_n = \sqrt{k_0^2 - (2n\pi/p_x)^2} \quad (8)$$

$$k_l = \sqrt{k_0^2 - (2l\pi/p_x)^2} \quad (9)$$

where $A_m$, $B_n$, and $C_l$ show excitation functions. An electric field E (vector) is determined uniquely using the magnetic field H (vector) and a boundary condition for an electric field and a magnetic field is determined on an opening surface. The boundary condition is multiplied by the three types of the basis functions $I_m$, $I_n$, and $I_l$ for weighting and resultant values are integrated on the boundary surface, thereby deriving a determinant. The excitation functions $A_m$, $B_n$, and $C_l$ are obtained by solving this determinant.

A scattering matrix of the first step structure #1 can be derived using the excitation functions $A_m$, $B_n$, and $C_l$. The scattering matrix of the first step structure #1 is connected through the distance (depth) a to a scattering matrix of the second step structure #2, thereby obtaining the transmission characteristics and the reflection characteristics of the entire structure of the wire grid device 1 shown in FIG. 1A responsive to incidence of terahertz light in the TM mode. An extinction ratio can be obtained in consideration of a propagation coefficient in a TE mode (Transverse Electromagnetic mode). This is for reason that transmissive arrangement is produced if an amplitude direction of the electric field of the terahertz light is orthogonal to the vertical direction in which the grids 1c extend (TM mode), whereas blocking arrangement is produced if the amplitude direction of the electric field of the terahertz light agrees with the vertical direction in which the grids 1c extend (TE mode).

Figure 3A:
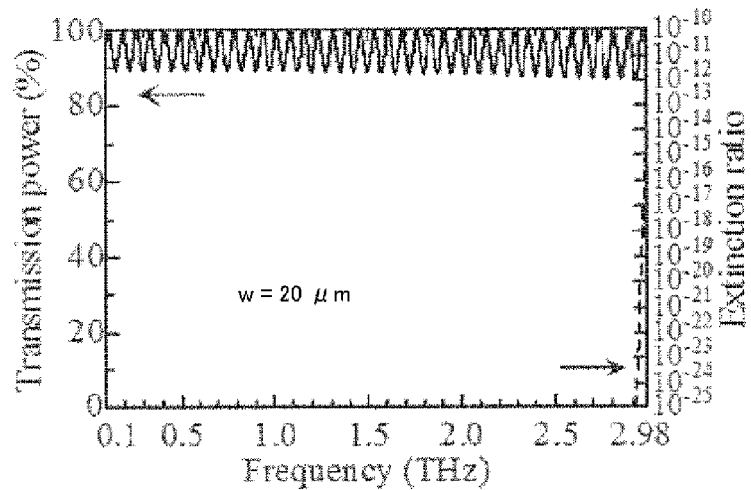
FIG. 3A shows analysis results obtained by using the analytical model about the wire grid device according to the first embodiment of this invention.
Figure 3B:
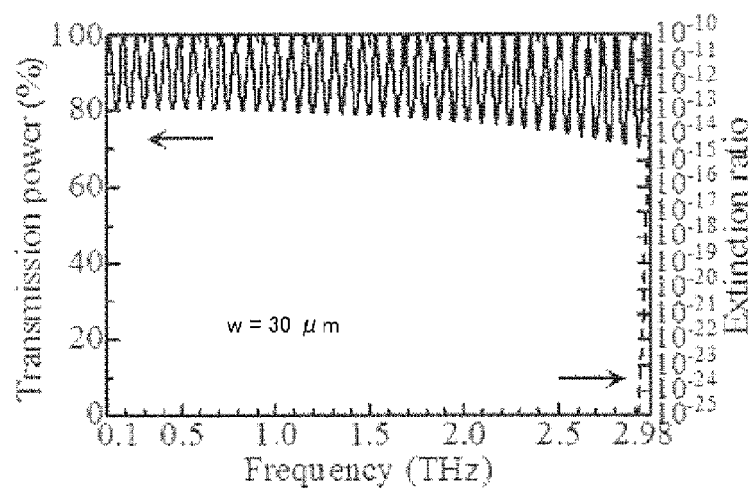
FIG. 3B shows analysis results obtained by using the analytical model about the wire grid device according to the first embodiment of this invention.
Figure 3C:
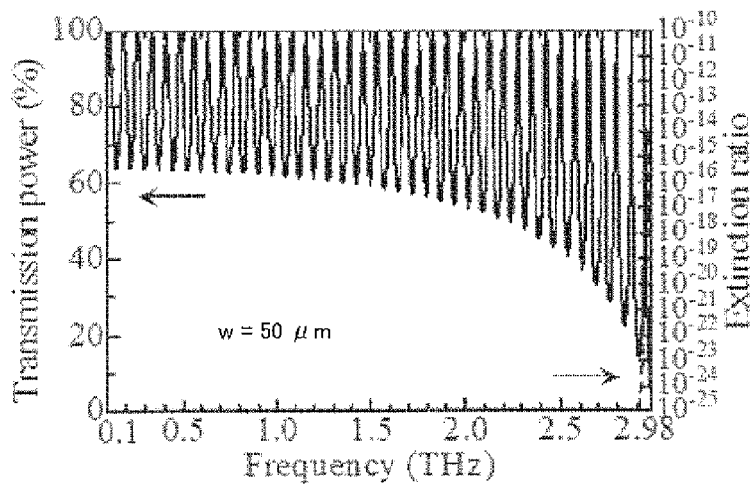
FIG. 3C shows analysis results obtained by using the analytical model about the wire grid device according to the first embodiment of this invention.

In the wire grid device 1 of the first embodiment, the width d of the slits 1b, the depth a of the frame, and the length l of the slits 1b are set at the following dimensions shown in FIG. 1C: about 50 μm, about 2.0 mm, and about 18 mm respectively. Further, with the width w of the grids 1c set at about 20 μm, about 30 μm, and about 50 μm, terahertz light of a frequency from 0.1 to 2.98 THz incident on the wire grid device 1 of the first embodiment is analyzed using the analytic model shown in FIG. 2. FIGS. 3A, 3B, and 3C show graphs indicating results of the analysis. In each of these drawings, the horizontal axis shows a frequency from 0.1 to 2.98 THz and the vertical axis shows transmission power [%] expressed in percentage (hereinafter called transmission power %) or an extinction ratio expressed in terms of an intensity transmittance. If an amplitude direction of the electric field of the incident terahertz light is orthogonal to the y-axis direction corresponding to the vertical direction of the grids 1c, the transmissive arrangement is produced and transmission power % of this case is indicated by a solid line. If the amplitude direction of the electric field of the terahertz light is parallel to the y-axis direction corresponding to the vertical direction of the grids 1c, the blocking arrangement is produced and an extinction ratio of this case is indicated by a dashed line. FIG. 3A shows analysis results obtained with the width w of the grids 1c set at about 20 μm. By referring to FIG. 3A, transmission power % in the transmissive arrangement oscillates vertically as a frequency becomes higher from 0.1 to 2.98 THz and favorable transmission power % about 85% or more is obtained. Regarding an extinction ratio in the blocking arrangement, a favorable extinction ratio of $10^{-12}$ or less is obtained in a range from 0.1 to 2.98 THz. FIG. 3B shows analysis results obtained with the width w of the grids 1c set at about 30 μm. By referring to FIG. 3B, regarding transmission characteristics in the transmissive arrangement, transmission power % oscillates vertically as a frequency becomes higher from 0.1 to 2.98 THz and favorable transmission power % about 70% or more is obtained. Regarding an extinction ratio in the blocking arrangement, a favorable extinction ratio of $10^{-12}$ or less is obtained in a range from 0.1 to 2.98 THz. FIG. 3C shows analysis results obtained with the width w of the grids 1c set at about 50 μm. By referring to FIG. 3C, transmission power % in the transmissive arrangement oscillates vertically as a frequency becomes higher from 0.1 to 2.98 THz and favorable transmission power % about 60% or more is obtained before and when the frequency becomes about 1.50 THz. If the frequency exceeds 1.5 THz, transmission power % is reduced gradually but transmission power % of about 20% or more is still obtained. Regarding an extinction ratio in the blocking arrangement, a favorable extinction ratio of $10^{-12}$ or less is obtained in a range from 0.1 to 2.98 THz. As understood from above, reduction in the width w of the grids 1c increases transmission power % further and the width w of the grids 1c is preferably about 50 μm or less. By employing the aforementioned parameter values in the wire grid device 1 of the first embodiment, in terms of transmission power % in the transmissive arrangement and an extinction ratio (intensity transmittance) in the blocking arrangement about terahertz light of a frequency from 0.1 to 2.98 THz shown in FIGS. 3A to 3C, transmission power % becomes 20% at worst. Meanwhile, an extinction ratio of $10^{-12}$ or less is obtained with transmission power % at this value. It is thus understood that the wire grid device 1 operates as a polarizer for terahertz light of a frequency from 0.1 to 2.98 THz achieving favorable characteristics that cannot be achieved conventionally.

FIG. 4A is a perspective view showing the structure of a wire grid device 2 according to a second embodiment of this invention. FIG. 4B is a perspective view showing the structure of a film substrate 10 of the wire grid device 2 according to the second embodiment of this invention. FIG. 4C is a table showing an example of the dimension of each part of the wire grid device 2 according to the second embodiment of this invention.

As shown in FIGS. 4A and 4B, the wire grid device 2 of the second embodiment of this invention is formed by stacking a plurality of film substrates including a film substrate 10a, a film substrate 10b, a film substrate 10c, a film substrate 10d, and a film substrate 10e, search made of a rectangular polymer film 11 including an elongated rectangular metal thin plate 12 formed on a substantially central area of one surface of the polymer film 11. For example, the polymer film 11 is a cycloolefin polymer film achieving low loss in a terahertz wave band and having a thickness d. The metal thin plate 12 is formed by being deposited on or affixed to one surface of the polymer film 11. Alternatively, the metal thin plate 12 is formed by etching a metal thin film made of Cu deposited on an entire surface of the polymer film 11. The metal thin plate 12 has a length l (lower-case character l), a width a, and a thickness t. The metal thin plate 12 is disposed on a substantially central area of the polymer film 11. In this case, lengths from the opposite long sides of the polymer film 11 to corresponding long sides of the metal thin plate 12 are both b. The thickness d of the polymer film 11 is the thickness d of the film substrate 10.

As shown in FIG. 4A, the wire grid device 2 of the second embodiment is formed by stacking the plurality of film substrates including the film substrates 10a, 10b, 10c, 10d, and 10e. The plurality of film substrates including the film substrates 10a to 10e each has the same structure as the film substrate 10 shown in FIG. 4B. The plurality of film substrates including the film substrates 10a to 10e is stacked in a manner such that the respective metal thin plates 12 on the film substrates 10a to 10e overlap each other. In this case, an interval between adjacent metal thin plates 12 becomes d corresponding to the thickness of the polymer film 11. In this way, the plurality of metal thin plates 12 overlapping vertically forms parallel flat plates, thereby forming a wire grid. In this case, the interval between the metal thin plates 12 as parallel flat plates is a parameter that deter mines the performance of the wire grid device 2. This interval is determined uniquely using the thickness of the film substrate 10. Specifically, even if being produced on a large scale, the wire grid device 2 of the second embodiment can still maintain this interval at a constant value stably, thereby increasing the yield of the wire grid device 2.

FIG. 4C shows an example of the dimension of each part of the wire grid device 2 according to the second embodiment. As shown in the table of FIG. 4C, the width a, the thickness t, and the length l of the metal thin plate 12 are about 1.0 mm, about 0.5 μm, and about 12.0 mm respectively. The length b from the long side of the polymer film 11 to the corresponding long side of the metal thin plate 12 is about 2.0 mm. The thickness d of the polymer film 11 is about 50 μm. The number of the film substrates 10 to be stacked is determined in a manner such that a dimension obtained by stacking the film substrates 10 reaches the dimension of the height of an opening required for the wire grid device 1.

Figure 5:
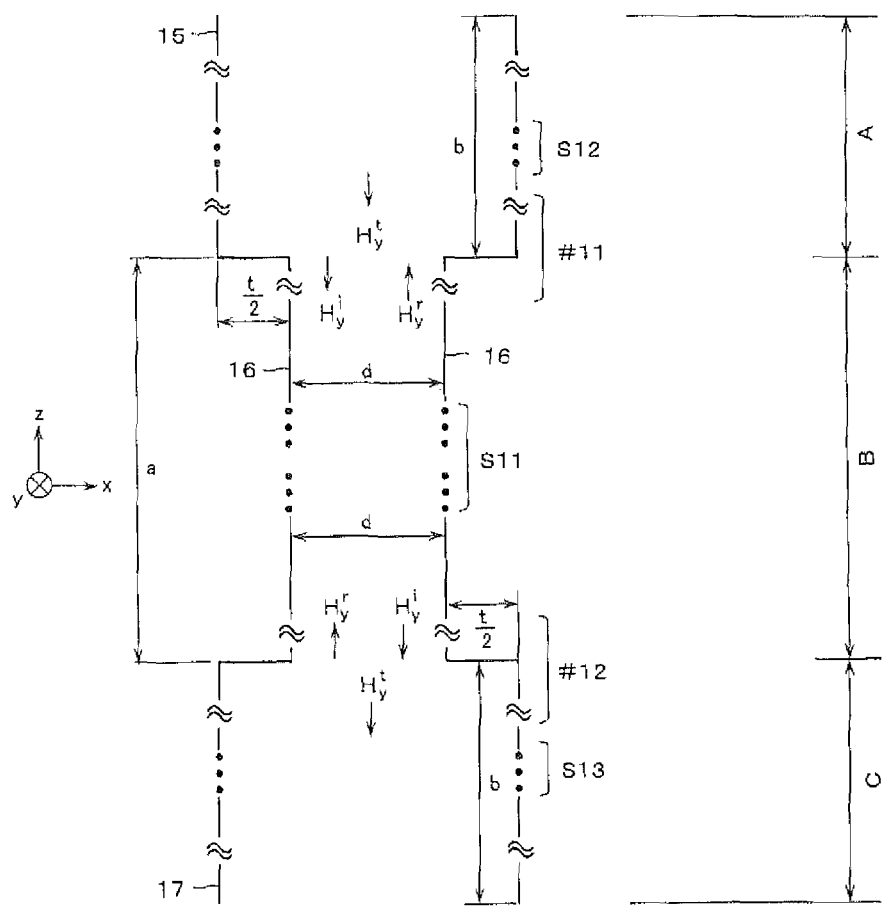
FIG. 5 shows an analytical model about the wire grid device according to the second embodiment of this invention.

FIG. 5 shows an analytical model used for analyzing a transmittance and an extinction ratio of the wire grid device 2 of the second embodiment.

Terahertz light incident on the wire grid device 2 of the second embodiment to travel in the z-axis direction first enters the polymer film 11, travels the length b in the polymer film 11, and reaches the metal thin plate 12. Next, the terahertz light travels across the metal thin plate 12 having the width a and then reaches the polymer film 11 again. After traveling the length b in the polymer film 11, the terahertz light exits the wire grid device 2. FIG. 5 shows an analytical model prepared by modeling this passage. This analytical model is formed of: a region A of periodic boundary walls 15 having a length b as a virtual region of the polymer film 11; a region B of electric walls 16a coupled step structure #11 to the region A of the periodic boundary walls 15, facing each other at an interval d, and having a width (length) a; and a region C of periodic boundary walls 17 having the length b as a virtual region of the polymer film 11 and coupled in step structure #12 to the region B. The region B corresponds to a region formed of the metal thin plates 12 each having the width a and the thickness t and facing each other at the interval d. Thus, the step structure #11 connecting the regions A and B has a step height t/2 that is half of the thickness t of the metal thin plate 12. The step structure #12 connecting the regions B and C also has the step height t/2.

A scattering matrix S12 is connected in the region A. The step structure #11 of the height t/2 connecting the regions A and B is analyzed by the mode-matching method. A scattering matrix S11 is connected in the region B. The step structure #12 of the height t/2 connecting the regions B and C is analyzed by the mode-matching method. A scattering matrix S13 is connected in the region C. The analysis mentioned herein is conducted by the mode-matching method in the same way as the analysis on the wire grid device 1 of the first embodiment, so it will not be described again.

Figure 6:
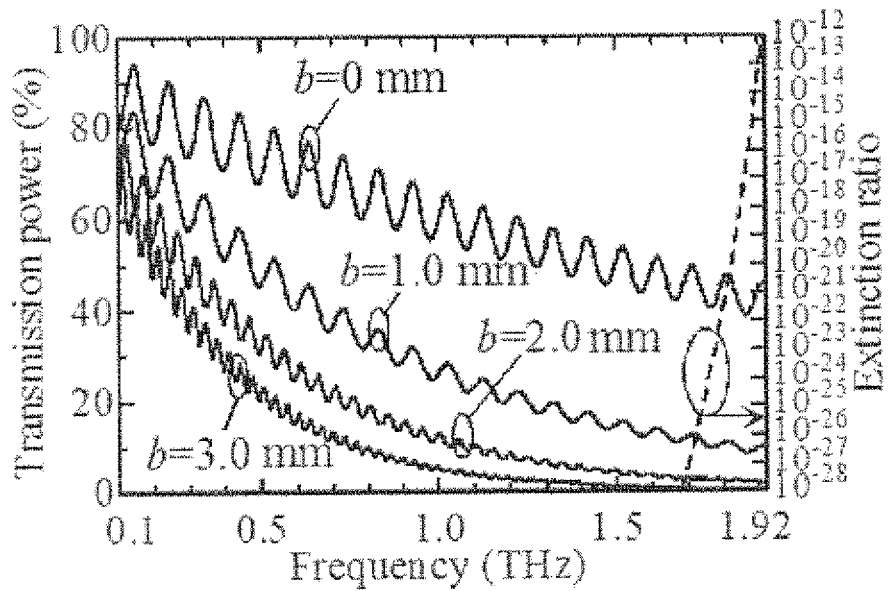
FIG. 6 shows analysis results obtained by using the analytical model about the wire grid device according to the second embodiment of this invention.

In the wire grid device 2 of the second embodiment, the width a, the length l, and the thickness t of the metal thin plate 12, and the thickness d of the film substrate 10 are set at the aforementioned dimensions shown in FIG. 4C. Further, with the complex index of refraction of the polymer film 11 set at 1.53+j0.0064 and the length b of the polymer film 11 set at about 0 mm, about 1.0 mm, about 2.0 mm, and about 3.0 mm, terahertz light of a frequency from 0.1 to 1.92 THz incident on the wire grid device 2 of the second embodiment is analyzed using the analytic model shown in FIG. 5. FIG. 6 shows graphs indicating results of the analysis. In FIG. 6, the horizontal axis shows a frequency from 0.1 to 1.92 THz and the vertical axis shows transmission power in percentage (transmission power [%]) or an extinction ratio expressed in terms of an intensity transmittance. If an amplitude direction of the electric field of the incident terahertz light is orthogonal to the y-axis direction corresponding to the vertical direction of the wire grid formed of the metal thin plates 12 (TM mode), the transmissive arrangement is produced and transmission power % of this case is indicated by solid lines. If the amplitude direction of the electric field of the incident terahertz light is parallel to the y-axis direction corresponding to the vertical direction of the wire grid formed of the metal thin plates 12 (TE mode), the blocking arrangement is produced and an extinction ratio of this case is indicated by a dashed line. By referring to FIG. 6, transmission power % in the transmissive arrangement is reduced while slightly oscillating vertically as a frequency becomes higher from 0.1 THz. Most favorable transmission power % is obtained if the length b is 0 mm. In this case, transmission power % from about 94 to about 40% is obtained in a range from 0.1 to 1.92 THz. If the length b is about 1.0 mm, transmission power % from about 83 to about 10% is obtained in a range from 0.1 to 1.92 THz. If the length b is about 2.0 mm, transmission power % from about 78 to about 2% is obtained in a range from 0.1 to 1.92 THz. If the length b is about 3.0 mm, transmission power % from about 70 to about 1% is obtained in a range from 0.1 to 1.92 THz. In this way, increase in the length b reduces transmission power %. This is considered to be caused by the increase in the length b increases attenuation through the film substrate 10. Regarding an extinction ratio in the blocking arrangement, a favorable extinction ratio of $10^{-12}$ or less is obtained in a range from 0.1 to 1.92 THz. An extinction ratio is substantially constant while the length b changes from 0 to 3.0 mm.

Figure 7:
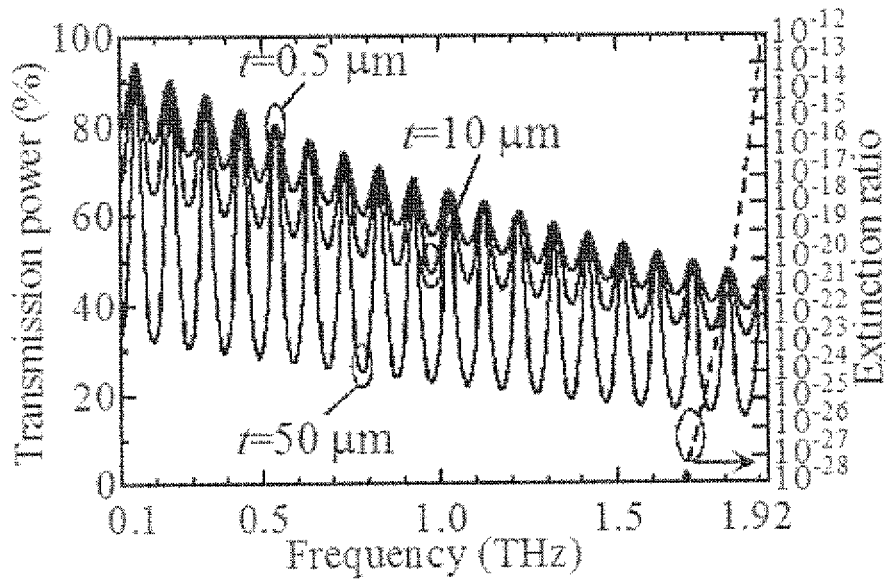
FIG. 7 shows different analysis results obtained by using the analytical model about the wire grid device according to the second embodiment of this invention.

In the wire grid device 2 of the second embodiment, the width a and the length l of the metal thin plate 12, and the thickness d and the length b of the film substrate 10 are set at the dimensions shown in FIG. 4C. Further, with the complex index of refraction of the polymer film 11 set at 1.53+j0.0064 and the thickness t of the metal thin plate 12 set at about 0.5 μm, about 10 μm, and about 50 μm, terahertz light of a frequency from 0.1 to 1.92 THz incident on the wire grid device 2 of the second embodiment is analyzed using the analytic model shown in FIG. 5. FIG. 7 shows graphs indicating results of the analysis. In FIG. 7, the horizontal axis shows a frequency from 0.1 to 1.92 THz and the vertical axis shows transmission power in percentage (transmission power [%]) or an extinction ratio expressed in terms of an intensity transmittance. Transmission power % in the transmissive arrangement is indicated by solid lines. An extinction ratio in the blocking arrangement is indicated by a dashed line. By referring to FIG. 7, transmission power % in the transmissive arrangement is reduced while slightly oscillating vertically as a frequency becomes higher from 0.1 THz. If the thickness t is about 0.5 μm, transmission power % from about 94 to about 42% is obtained in a range from 0.1 to 1.92 THz. If the thickness t is about 10 μm, transmission power % from about 94 to about 38% is obtained in a range from 0.1 to 1.92 THz. If the thickness t is about 50 μm, transmission power % from about 94 to about 19% is obtained in a range from 0.1 to 1.92 THz. In this case, transmission power % is reduced at frequencies at given intervals. Regarding an extinction ratio in the blocking arrangement, a favorable extinction ratio of $10^{-12}$ or less in terms of an intensity transmittance is obtained in a range from 0.1 to 1.92 THz. An extinction ratio is substantially constant while the thickness t changes from 0.5 to 50 μm.

By employing the aforementioned parameter values in the wire grid device 2 of the second embodiment, in terms of transmission power % in the transmissive arrangement and an extinction ratio (intensity transmittance) in the blocking arrangement about terahertz light of a frequency from 0.1 to 1.92 THz shown in FIGS. 6 and 7, transmission power % becomes 1% at worst. Meanwhile, an extinction ratio of $10^{-12}$ or less is obtained with transmission power % at this value. It is thus understood that the wire grid device 2 operates as a polarizer for terahertz light of a frequency from 0.1 to 1.92 THz achieving favorable characteristics that cannot be achieved conventionally.

Figure 8A:
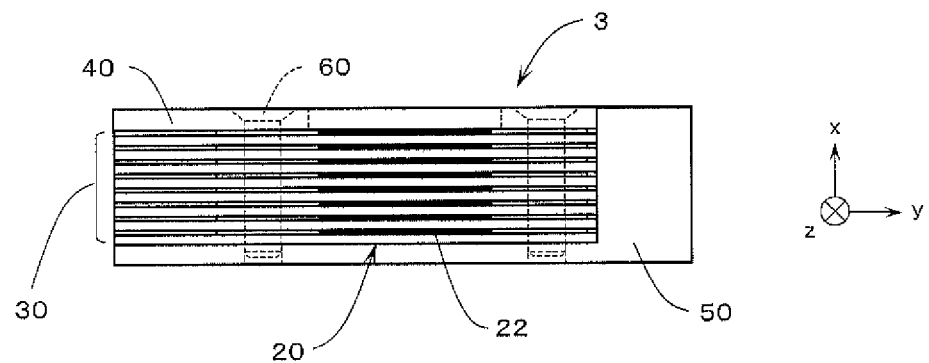
FIG. 8A is a front view showing the structure of a wire grid device according to a third embodiment of this invention.
Figure 8B:
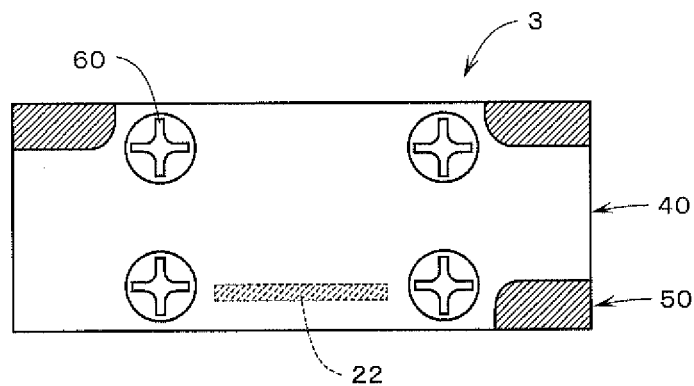
FIG. 8B is a plan view showing the structure of the wire grid device according to the third embodiment of this invention.
Figure 9:
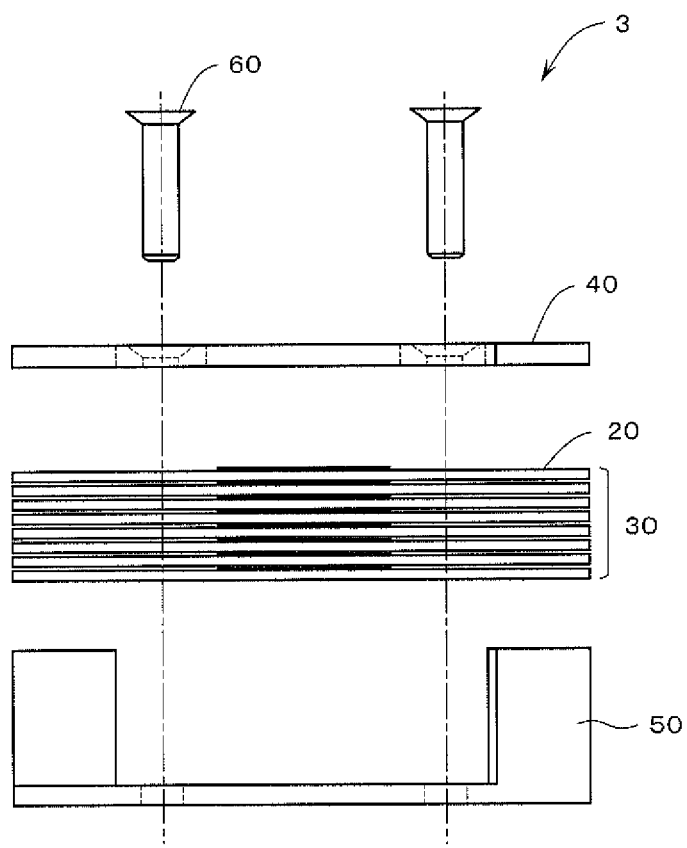
FIG. 9 is an exploded assembly view showing the structure of the wire grid device according to the third embodiment of this invention.
Figure 10A:
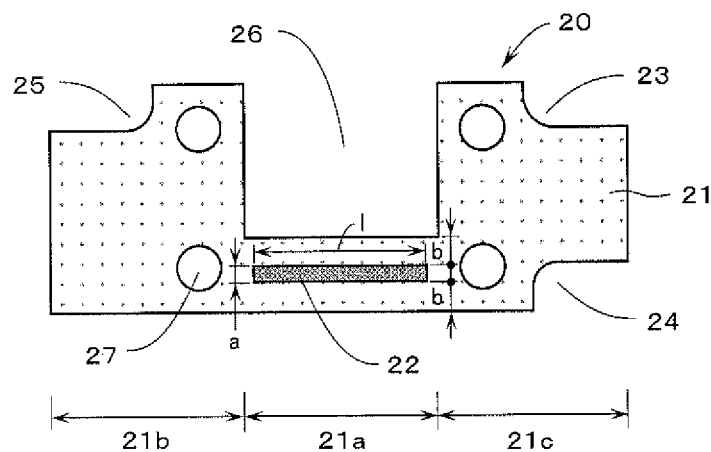
FIG. 10A is a plan view showing the structure of a film substrate of the wire grid device according to the third embodiment of this invention.
Figure 10B:
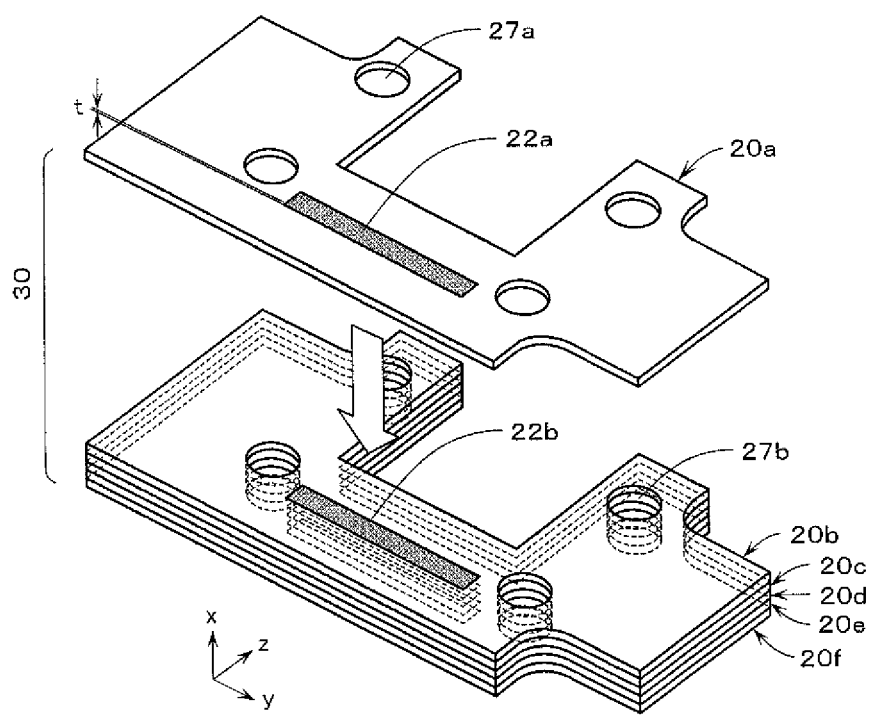
FIG. 10B is a perspective view showing the structure of a film substrate stack of the wire grid device according to the third embodiment of this invention.
Figure 11A:
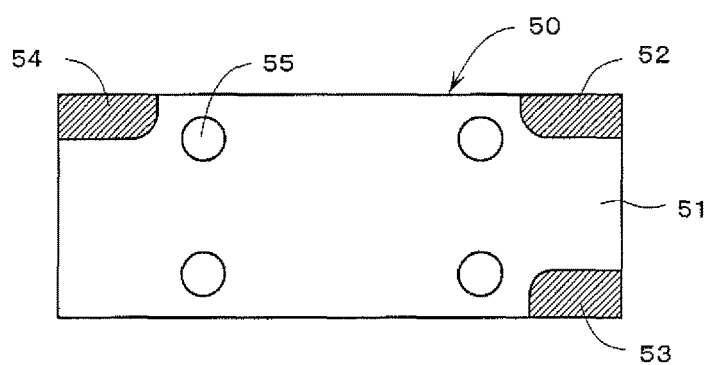
FIG. 11A is a plan view showing the structure of a base of the wire grid device according to the third embodiment of this invention.
Figure 11B:
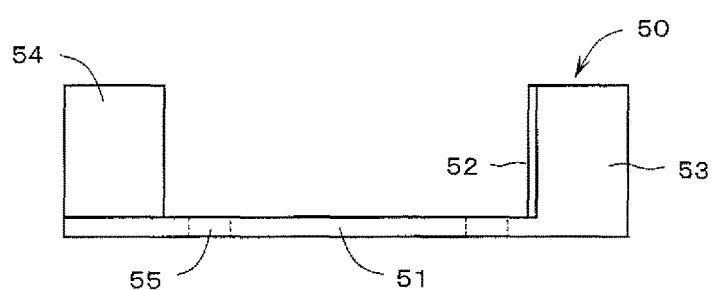
FIG. 11B is a front view showing the structure of the base of the wire grid device according to the third embodiment of this invention.
Figure 12A:
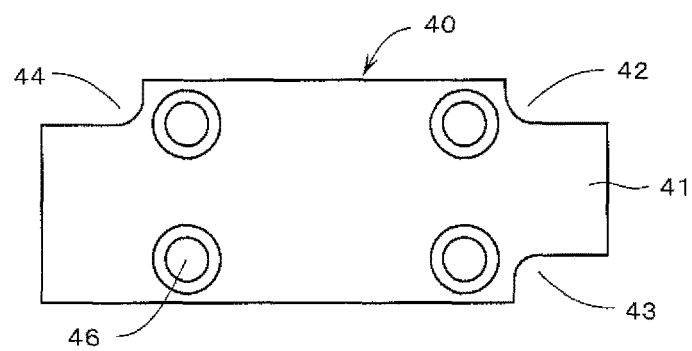
FIG. 12A is a plan view showing the structure of a retainer plate of the wire grid device according to the third embodiment of this invention.
Figure 12B:
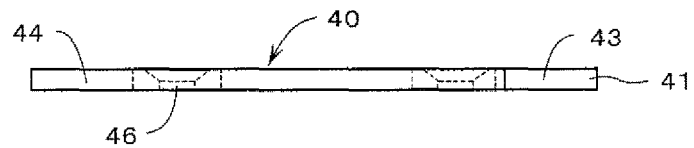
FIG. 12B is a front view showing the structure of the retainer plate of the wire grid device according to the third embodiment of this invention.

FIGS. 8A to 12B show the structure of a wire grid device 3 according to a third embodiment of this invention. FIGS. 8A and 8B are a front view and a plan view respectively showing the structure of the wire grid device 3 according to the third embodiment. FIG. 9 is an exploded assembly view showing the structure of the wire grid device 3 according to the third embodiment. FIGS. 10A and 10B are perspective views showing the structure of a film substrate and that of a film substrate stack respectively of the wire grid device 3 according to the third embodiment. FIGS. 11A and 11B are a plan view and a front view respectively showing the structure of a base of the wire grid device 3 according to the third embodiment. FIGS. 12A and 12B are a plan view and a front view respectively showing the structure of a retainer plate of the wire grid device 3 according to the third embodiment.

As shown in these drawings, the wire grid device 3 of the third embodiment includes a base 50, a film substrate stack 30 with a plurality of stacked film substrates 20, and a retainer plate 40. The base 50 shown in FIGS. 11A and 11B is made of metal such as an aluminum alloy. The base 50 includes: a bottom 51 like a horizontally-long rectangular flat plate; and a first upright column 52, a second upright column 53, and a third upright column 54 extending vertically to a given height from three corners except one corner of the upper surface of the bottom 51. The first to third upright columns 52 to 54 have horizontally-long rectangular cross sections. One of the corners of each of the first to third upright columns 52 to 54 facing the center of the base 50 is provided with an R part and is rounded. Four screw holes 55 are formed in the bottom 51.

The retainer plate 40 shown in FIGS. 12A and 12B is made of metal such as an aluminum alloy. The retainer plate 40 includes a flat plate part 41 like a horizontally-long rectangular flat plate. The flat plate part 41 has a first cutout 42, a second cutout 43, and a third cutout 44 formed at three corners of the flat plate part 41 except one corner and having their shapes substantially the same as the cross-sectional shapes of the first to third upright columns 52 to 54 respectively. Thus, if the retainer plate 40 is combined with the base 50, the first to third upright columns 52 to 54 are fitted in the first to third cutouts 42 to 44 respectively. The flat plate part 41 is provided with four insertion through holes 46 formed in positions same as those of the screw holes 55 in the base 50. The four insertion through holes 46 are countersunk.

The film substrate 20 of the wire grid device 3 of the third embodiment is formed of a polymer film 21 having an outer shape substantially the same as that of the retainer plate 40 and a horizontally-long metal thin plate 22 provided on the polymer film 21. The polymer film 21 has a shape like a horizontally-long rectangular flat plate and has an attachment part 21b and an attachment part 21c formed on opposite sides of the polymer film 21. A rectangular cutout 26 is formed between the attachment parts 21b and 21c. A horizontally-long holding part 21a holding the metal thin plate 22 is formed on one side of a central area. A first cutout 23, a second cutout 24, and a third cutout 25 having shapes same as the cross-sectional shapes of the first to third upright columns 52 to 54 respectively are formed in one corner of the attachment part 21b and two corners of the attachment part 21c corresponding to the positions of the first to third upright columns 52 to 54. The horizontally-long rectangular metal thin plate 22 is formed by being deposited on or affixed to one surface of the holding part 21a. Alternatively, the metal thin plate 22 is formed by etching a metal thin film made of Cu deposited on one surface of the polymer film 21. The metal thin plate 22 has a length l (lower-ease character 1), a width a, and a thickness t. In this case, lengths from opposite edges of the holding part 21a to corresponding long sides of the metal thin plate 22 are both b. The attachment parts 21b and 21c are provided with four holes 27 formed in positions corresponding to the positions of the four screw holes 55 formed in the base 50. The polymer film 21 has a thickness d.

The film substrate stack 30 is formed by stacking a plurality of film substrates 20 of the aforementioned structure while aligning the film substrates 20 as shown in FIG. 10B. A film substrate 20a, a film substrate 20b, a film substrate 20c, a film substrate 20d, a film substrate 20e, and a film substrate 20f of FIG. 10B have the same structure as the film substrate 20 of FIG. 10A. A film substrate 20a is holding a metal thin plate 22a, and provided with four holes 27a. Also a film substrate 20b is holding a metal thin plate 22b, and provided with four holes 27b. A film substrate 20c, a film substrate 20d, a film substrate 20e and a film substrate 20f have the same structure as the film substrate 20a and 20b. The film substrate stack 30 of FIG. 10B is formed of the six film substrates 20a to 20f. Meanwhile, the film substrate stack 30 is shown schematically in FIG. 10B and is actually formed by stacking dozens of film substrates 20 or more. In the film substrate stack 30, a metal thin plate 22a, a metal thin plate 22b, a metal thin plate 22c, a metal thin plate 22d, a metal thin plate 22e, and a metal thin plate 22f formed on the film substrates 20a to 20f respectively overlap in the same position and an interval between adjacent metal thin plates 22 becomes d corresponding to the thickness of the polymer film 21. In this way, the plurality of metal thin plates 22 overlapping vertically forms parallel flat plates, thereby forming a wire grid.

As shown in FIG. 9, the film substrate stack 30 formed in the aforementioned way is arranged on the base 50 and housed in the base 50. While the film substrate stack 30 is housed, the first to third upright columns 52 to 54 of the base 50 are respectively fitted in the first to third cutouts 23 to 25 in each film substrate 20 of the film substrate stack 30. In this way, each film substrate 20 of the film substrate stack 30 is aligned with the base 50 while being housed in the base 50. The four holes 27 in each film substrate 20 of the film substrate stack 30 are aligned with the four screw holes 55 in the base 50.

After the film substrate stack 30 is housed in the base 50, the retainer plate 40 is arranged on the base 50 to be placed on the film substrate stack 30 housed in the base 50. At this time, the first to third upright columns 52 to 54 of the base 50 are respectively fitted in the first to third cutouts 42 to 44 in the retainer plate 40 to align the retainer plate 40 with the base 50. Further, the four insertion through holes 46 in the retainer plate 40 are aligned with the four holes 27 in each film substrate 20 of the film substrate stack 30 and the four screw holes 55 in the base 50.

Attachment screws 60 are passed through all the four insertion through holes 46 in the retainer plate 40. Then, the four attachment screws 60 passed through the holes 27 in each film substrate 20 of the film substrate stack 30 are threadedly engaged with all the screw holes 55 in the base 50. This forms tight contact between the film substrates 20, thereby assembling the wire grid device 3 of the third embodiment shown in FIGS. 8A and 8B. In the wire grid device 3 of the third embodiment, as a result of the presence of the flat plate part 41 of the retainer plate 40, the holding parts 21a of the film substrates 20, on which the metal thin plates 22 are formed, contact each other under pressure. Thus, the interval between the metal thin plates 22 is maintained stably. FIG. 8A shows how all the metal thin plates 22 on the corresponding film substrates 20 of the film substrate stack 30 are vertically arranged parallel to each other to form the wire grid. In this case, the interval between the metal thin plates 22 as parallel flat plates is a parameter that determines the performance of the wire grid device 3. This interval is determined uniquely using the thickness of the film substrate 20. Specifically, in the wire grid device 3 of the third embodiment, the film substrate stack 30 including the metal thin plates 22 as parallel flat plates is caught between the base 50 and the retainer plate 40 fixedly attached to each other with the four attachment screws 60. This maintains the gap between the metal thin plates 22 as parallel flat plates considerably stably. Thus, even if being produced on a large scale, the wire grid device 3 can still maintain this interval at a constant value stably, thereby increasing the yield of the wire grid device 3. The four attachment screws 60 are countersunk screws, so that the heads of the attachment screws 60 are accommodated in the four countersunk insertion through holes 46 in the retainer plate 40. By threadedly engaging the attachment screws 60, the base 50, the film substrate stack 30, and the retainer plate 40 are aligned with each other and attached fixedly to each other.

Figure 13A:
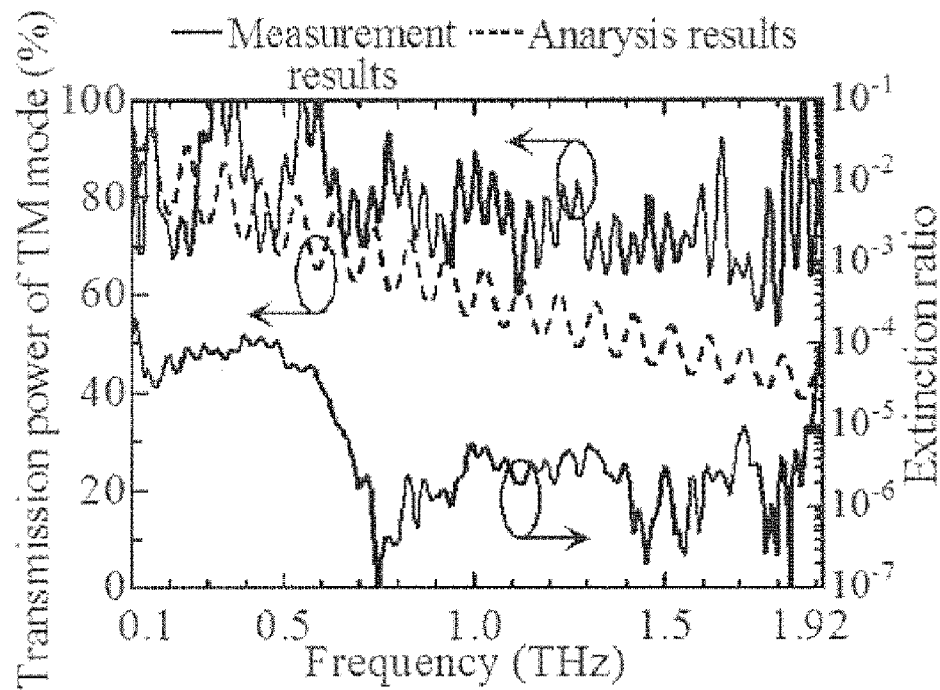
FIG. 13A shows analysis results about the wire grid device according to the third embodiment of this invention.

A transmittance and an extinction ratio of the wire grid device 3 according to the third embodiment can be analyzed using the analytic model shown in FIG. 5. In the wire grid device 3 of the third embodiment, with the width a, the length l, and the thickness t of the metal thin plate 22 set at about 1.0 mm, about 30.0 mm, and about 0.5 µm respectively, the thickness d and the length b of the film substrate 20 set at about 50 µm and about 0 mm respectively, and the complex index of refraction of the polymer film 21 set at 1.53+j0.0064, an analysis is conducted using the analytic model shown in FIG. 5. FIG. 13A includes a graph showing results of this analysis and a graph showing measurement results. In FIG. 13A, the horizontal axis shows a frequency from 0.1 to 1.92 THz and the vertical axis shows transmission power in percentage in the TM mode (transmission power of TM mode [%]) or an extinction ratio expressed in terms of an intensity transmittance. The analysis results indicated by a dashed line in FIG. 13A are obtained in the transmissive arrangement where an amplitude direction of the electric field of incident terahertz light is orthogonal to the y-axis direction corresponding to the vertical direction of the wire grid formed of the metal thin plates 22. By referring to transmission power % in the transmissive arrangement, shown in these analysis results, transmission power % is reduced while slightly oscillating vertically as a frequency becomes higher from 0.1 THz. Transmission power % from about 94 to about 40% is obtained in a range from 0.1 to 1.92 THz.

An upper solid line shows measurement results about transmission power % obtained in the case (transmissive arrangement) where the incident terahertz light has the TM mode and the amplitude direction of the electric field of the terahertz light is orthogonal to the y-axis direction corresponding to the vertical direction of the wire grid formed of the metal thin plates 22. By referring to these measurement results, transmission power % is reduced slightly while oscillating vertically in a range of 30% at maximum as a frequency becomes higher from 0.1 THz. Transmission power % from about 100 to about 60% is obtained in a range from 0.1 to 1.92 THz. Such transmission power % is found to be similar to but more favorable than that of the analysis results.

A lower solid line shows measurement results about an extinction ratio obtained in the case (blocking arrangement) where the incident terahertz light has the TE mode and the amplitude direction of the electric field of the terahertz light is parallel to the y-axis direction corresponding to the vertical direction of the wire grid formed of the metal thin plates 22. As understood from these measurement results, the extinction ratio is about $10^{-4}$ at a frequency of 0.1 THz. As a frequency becomes higher to a level around 0.75 THz, the extinction ratio is enhanced to become $10^{-7}$ or less. In a range from a level over 0.5 to 1.92 THz, an extension ratio around $10^{-6}$ is obtained.

By employing the aforementioned parameter values in the wire grid device 3 of the third embodiment, in terms of transmission power % in the transmissive arrangement and an extinction ratio (intensity transmittance) in the blocking arrangement about terahertz light of a frequency from 0.1 to 1.92 THz shown in FIG. 13A, transmission power % becomes 60% at worst, meaning that favorable values are obtained about transmission power %. Meanwhile, an extinction ratio of $10^{-4}$ or less is obtained with transmission power % at this value. It is thus understood that the wire grid device 3 operates as a polarizer for terahertz light of a frequency from 0.1 to 1.92 THz achieving favorable characteristics that cannot be achieved conventionally.

Figure 13B:
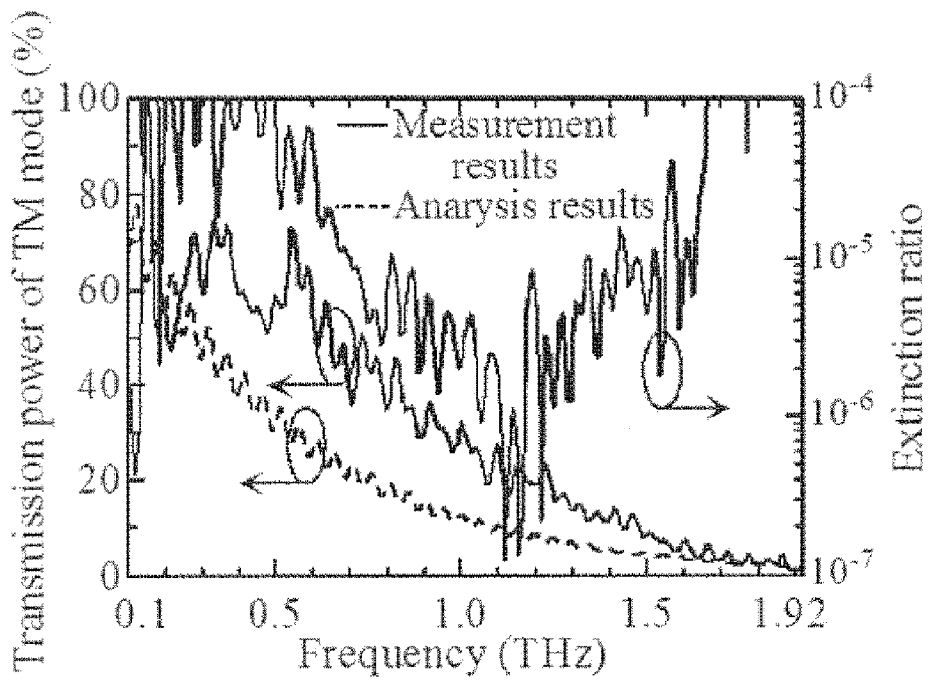
FIG. 13B shows analysis results about the wire grid device according to the third embodiment of this invention.
Figure 14:
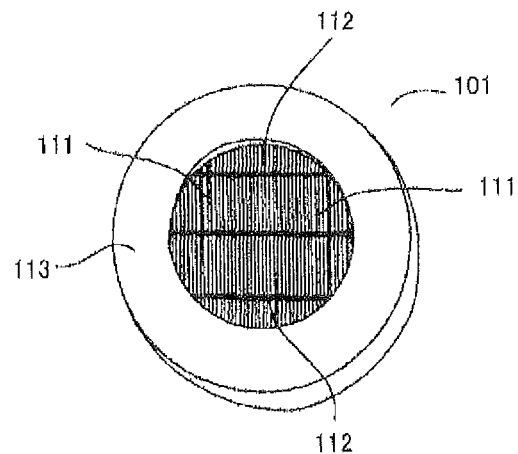
FIG. 14 is a perspective view showing the structure of a conventional metal plate for a wire grid.
Figure 15:
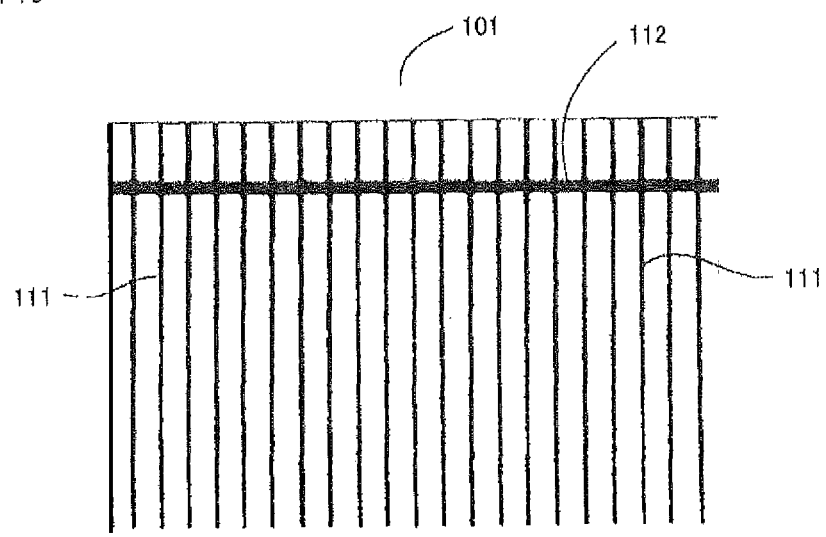
FIG. 15 is a plan view showing the structure of a part of the conventional metal plate for a wire grid in an enlarged manner.
Figure 16A:
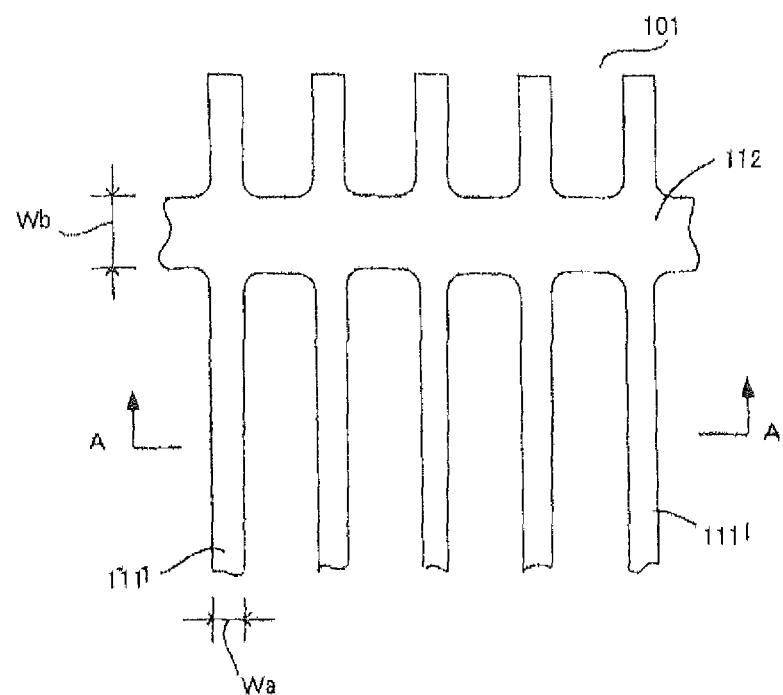
FIG. 16A is a plan view showing the structure of a different part of the conventional metal plate for a wire grid in an enlarged manner.
Figure 16B:
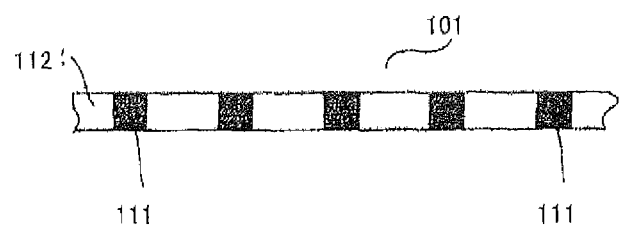
FIG. 16B is a sectional view taken along cutting line A-A showing the structure of the different part of the conventional metal plate for a wire grid.
Figure 17:
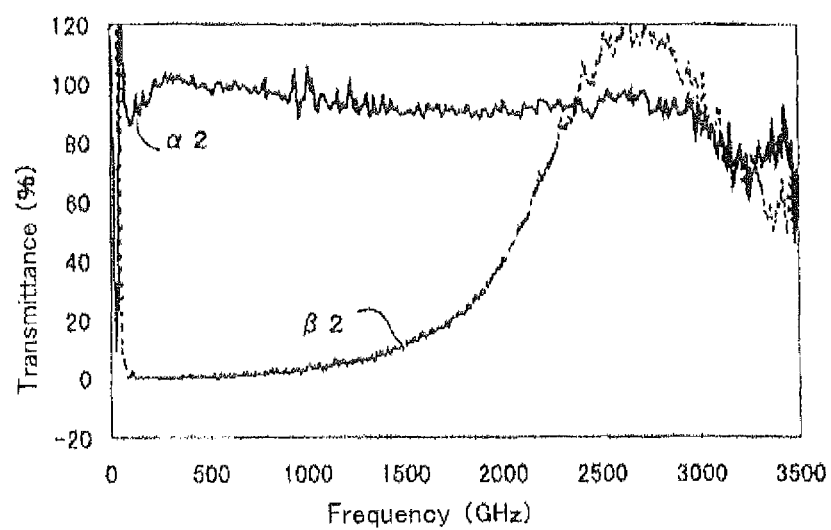
FIG. 17 shows the characteristics of the conventional metal plate for a wire grid.

In the wire grid device 3 of the third embodiment, with the width a, the length l, and the thickness t of the metal thin plate 22 set at about 1.0 mm, about 12.0 mm, and about 0.5 µm respectively, the thickness d and the length b of the film substrate 20 set at about 50 µm and about 2.0 mm respectively, and the complex index of refraction of the polymer film 21 set at 1.53+j0.0064, an analysis is conducted using the analytic model shown in FIG. 5. FIG. 13B includes a graph showing results of this analysis and a graph showing measurement results. In FIG. 13B, the horizontal axis also shows a frequency from 0.1 to 1.92 THz and the vertical axis also shows transmission power in percentage determined in the TM mode (transmission power of TM mode [%]) or an extinction ratio expressed in terms of an intensity transmittance. The analysis results indicated by a dashed line in FIG. 13B are obtained in the transmissive arrangement where an amplitude direction of the electric field of incident terahertz light is orthogonal to the y-axis direction corresponding to the vertical direction of the wire grid formed of the metal thin plates 22. By referring to transmission power % in the transmissive arrangement shown in these analysis results, transmission power % is reduced while slightly oscillating vertically as a frequency becomes higher from 0.1 THz. Transmission power % from about 78 to about 2% is obtained in a range from 0.1 to 1.92 THz.

A solid line indicated by a left arrow shows measurement results about transmission power % obtained in the case (transmissive arrangement) where the incident terahertz light has the TM mode and the amplitude direction of the electric field of the terahertz light is orthogonal to the y-axis direction corresponding to the vertical direction of the wire grid formed of the metal thin plates 22. By referring to these measurement results, transmission power % is reduced while slightly oscillating as a frequency becomes higher from 0.1 THz. Transmission power % from about 80 to about 2% is obtained in a range from 0.1 to 1.92 THz. Such transmission power % is found to be similar to but more favorable than that of the analysis results.

A solid line indicated by a right arrow shows measurement results about an extinction ratio obtained in the case (blocking arrangement) where the incident terahertz light has the TE mode and the amplitude direction of the electric field of the terahertz light is parallel to the y-axis direction corresponding to the vertical direction of the wire grid formed of the metal thin plates 22. As understood from these measurement results, the extinction ratio is about $10^{-4}$ at a frequency of 0.1 THz. As a frequency becomes higher to a level around 1.15 THz, the extinction ratio is enhanced to be in about $10^{-7}$ class. In a range from over a level around 1.15 to 1.92 THz, an extension ratio from about $10^{-5}$ to about $10^{-6}$ is obtained.

By employing the aforementioned parameter values in the wire grid device 3 of the third embodiment, in terms of transmission power % in the transmissive arrangement and an extinction ratio (intensity transmittance) in the blocking arrangement about terahertz light of a frequency from 0.1 to 1.92 THz shown in FIG. 13B, transmission power % becomes 2% at worst. Meanwhile, an extinction ratio about $10^{-4}$ is obtained with transmission power % at this value. It is thus understood that the wire grid device 3 operates as a polarizer for terahertz light of a frequency from 0.1 to 1.92 THz achieving favorable characteristics that cannot be achieved conventionally.

INDUSTRIAL APPLICABILITY

The aforementioned wire grid device of this invention is capable of achieving both a favorable transmittance and a high extinction ratio in about $10^{-6}$ class in a terahertz wave band. The number of film substrates to be stacked in the wire grid device of each of the second and third embodiments is determined in a manner such that a dimension obtained by stacking the film substrates reaches the dimension of the height of an opening required for the wire grid device. For application of the wire grid device of each of the second and third embodiments in a terahertz wave band, the width of a metal thin plate is preferably about 1.0 mm, the length of the metal thin plate is preferably from about 12.0 to about 30 mm, and the thickness d of the film substrates is preferably from about 0.5 to about 50 μm.

In this case, an interval between the metal thin plates as parallel flat plates forming the wire grid in the wire grid device of each of the second and third embodiments is a parameter that determines the performance of the wire grid device. This interval is determined uniquely using the thickness of the film substrates. Specifically, even if being produced on a large scale, the wire grid device of each of the second and third embodiments of this invention can still maintain this interval at a constant value stably, thereby increasing the yield of the wire grid device. Additionally, a frequency band to be applied can be changed only by changing the thickness of the film substrates. Further, a cycloolefin polymer film is used as a polymer film. However, this is not the only material for the film. The film can be made of any material that has a small dielectric dissipation factor in a terahertz wave band. Instead of the film, a film-like substance may be formed on a surface of each metal thin plate. For example, an insulating substance such as resin may be applied or affixed to a given thickness to the surface of each metal thin plate, thereby arranging the metal thin plates at given intervals so as to make the metal thin plates face each other.

In the wire grid device of the first embodiment, the slits are formed to extend in the vertical direction. The slits may certainly be formed to extend in the horizontal direction. What is required for the slits is to be formed in a substantially entire region of a frame to extend parallel to a side of the frame.

REFERENCE SIGNS LIST

1 Wire grid device
1a Frame
1b Slit
1c Grid
1d Electric wall
1e Periodic boundary wall
2 Wire grid device
3 Wire grid device
10 Film substrate
10a to 10e Film substrate
11 Polymer film
12 Metal thin plate
15 Periodic boundary wall
16 Electric wall
17 Periodic boundary wall
20 Film substrate
20a to 20f Film substrate
21 Polymer film
21a Holding part
21b Attachment part
21c Attachment part
22 Metal thin plate
22a to 22f Metal thin plate
23 First cutout
24 Second cutout
25 Third cutout
26 Rectangular cutout
27 Hole
30 Film substrate stack
40 Retainer plate
41 Flat plate part
42 First cutout
43 Second cutout
44 Third cutout
46 Insertion through hole
50 Base
51 Bottom
52 First upright column
53 Second upright column
54 Third upright column
55 Screw hole
60 Attachment screw
101 Metal plate for wire grid
111 Vertical bridge part
112 Cross bridge part
113 Flange part

The invention claimed is:

1. A wire grid device formed by stacking a plurality of film substrates, the film substrates each being formed of a rectangular film having one surface on which an elongated rectangular metal thin plate is formed, wherein
with the plurality of film substrates in a stacked condition, the metal thin plates are arranged so as to overlap each other and parallel flat plates configured by the metal thin plates on corresponding ones of the film substrates form a wire grid operating as a polarizer for terahertz light.

2. The wire grid device according to claim 1, wherein in the wire grid operating as the polarizer for terahertz light, a width of a short side of the metal thin plates is 1.0 mm and a thickness of the film substrates is from 0.5 to 50 μm.

3. The wire grid device according to claim 2, comprising:
a base having a bottom like a flat plate and a plurality of upright columns extending vertically from the upper surface of the bottom;
a film substrate stack formed of the plurality of stacked film substrates, the film substrates each having cutouts formed in positions corresponding to the positions of the upright columns of the base; and
a retainer plate having a flat plate part like a flat plate and cutouts formed in positions of the flat plate part corresponding to the positions of the upright columns of the base, wherein
the film substrate stack is housed in the base while being aligned with the base using the plurality of upright columns, the retainer plate is placed on the film substrate stack, and a screw passed through the retainer plate is threadedly engaged with the base.

4. The wire grid device according to claim 1, comprising:
a base having a bottom like a flat plate and a plurality of upright columns extending vertically from the upper surface of the bottom;
a film substrate stack formed of the plurality of stacked film substrates, the film substrates each having cutouts formed in positions corresponding to the positions of the upright columns of the base; and
a retainer plate having a flat plate part like a flat plate and cutouts formed in positions of the flat plate part corresponding to the positions of the upright columns of the base, wherein the film substrate stack is housed in the base while being aligned with the base using the plurality of upright columns, the retainer plate is placed on the film substrate stack, and a screw passed through the retainer plate is threadedly engaged with the base.

5. A wire grid device operating as a polarizer for terahertz light comprising a conductive frame of a rectangular parallelepiped having a certain depth and a large number of slits formed so as to penetrate the frame in a direction parallel to one side of the frame, wherein the presence of the large number of slits forms a large number of grids between the slits, the slits have a width of 50 μm, the frame has a depth of 2.0 mm, and the grids have a width of 50 μm or less.

* * * * *